United States Patent [19]

Rottenkolber

[11] 4,257,264
[45] Mar. 24, 1981

[54] TIRE CHECKING APPARATUS

[75] Inventor: Hans Rottenkolber, Amerang, Fed. Rep. of Germany

[73] Assignee: Opto Produkte AG, Zürich, Switzerland

[21] Appl. No.: 41,019

[22] Filed: May 21, 1979

[30] Foreign Application Priority Data

May 22, 1978 [DE] Fed. Rep. of Germany ....... 2822204

[51] Int. Cl.$^3$ .............................................. G01N 22/02
[52] U.S. Cl. ...................................... 73/146; 356/359
[58] Field of Search .......................... 73/146; 250/550; 356/348, 359

[56] References Cited

U.S. PATENT DOCUMENTS

| | | |
|---|---|---|
| 3,644,047 | 2/1972 | Brown et al. .......................... 356/348 |
| 3,976,380 | 8/1976 | Rottenkolber et al. .............. 356/348 |

Primary Examiner—Jerry W. Myracle
Attorney, Agent, or Firm—Becker & Becker, Inc.

[57] ABSTRACT

A tire quality control arrangement for nondestructive material testing of vehicle tires, aircraft tires, and the like by way of holographic interferometry. A conical mirror arranged in the path of the object beam to examine a tire positioned in concentric relation with the conical mirror; a projecting device includes an objective positioned at the observation point for providing the interference pattern of at least one "meridian" portion of the inner surface of the tire to be examined on a screen; a light intensity measuring device ascertains the brightness distribution of the interference pattern or figure along a "meridian" cutting line of the tire being examined and an extreme value detector ascertains the position of the brightness extremes of the interference pattern succeeded by a device for determining the density or distribution of extremes along the "meridian" line. The output of the device for determining the density of extremes is connected to a comparing device for comparing the extrema density values with predetermined extrema density limit values. The comparing device produces a signal corresponding to a transgression, or corresponding to an excess value, and this signal is passed to the output of the comparing device connected, in turn, to an alarm device for the provision of an alarm signal.

12 Claims, 7 Drawing Figures

TIRE CHECKING APPARATUS

The present invention relates to a tire checking apparatus for nondestructive testing of material of vehicle and airplane tires concerning flaws or imperfections.

The apparatus makes use of a laser source, a photo shutter, an optical circuit dividing the light beam emanating from the laser source into an object beam and into a reference beam and which deflects these beams, a conical mirror concentrically surrounded by the tire to be checked or examined which conical mirror is located in the path of the object beam, a registering layer, and an observing device or system. The virtual reflection of the object beams or rays emanating from a virtual light source and which are reflected by the tire surface are located on ellipsoids the focal points of which are provided or formed by this virtual light source and the observing point. At the observing point there is provided the objective or object glass or lens of a representing or imaging device which presents on a screen the interference figure, pattern, or delineation of at least one so-called "meridian" portion of the inner surface of the tire that is examined.

A tire checking apparatus is known and has been used in a manner that the interference pattern or figures could be evaluated by visual observation. On the basis of the mainfest interference lines and their typical configurations deductions concerning certain tire defects could be made. Thus, concentric rings are indicative of delaminations of a relatively small area, or inclusions of gas or fluids. Parallel, in the radial plane of the tire more frequently occurring lines are indicative of fatigue phenomena. However, such quality control requires a certain degree of experience and, at times, requires such a period of time that is unsuitable for, or greater than, the pertaining cycle time of the apparatus and, thus, would interfere with the continuity of the checking or examining process. Thus, there exists the need, particularly for industrial, large-scale, tire production, for a means adapted to sort out the defective tires by means of an automatic quality control process, or to carry out such a automatic precontrol of the tire production, so as to carry out a full visual inspection of the tires sorted out by the precontrol.

It is accordingly an object of the invention to provide tire checking apparatus having an evaluating system for automatically carrying out the quality control or checking of tires.

This object and other objects and advantages of the invention will appear more cleay from the following specification in connection with the accompanying drawings, in which.

Figure 1:
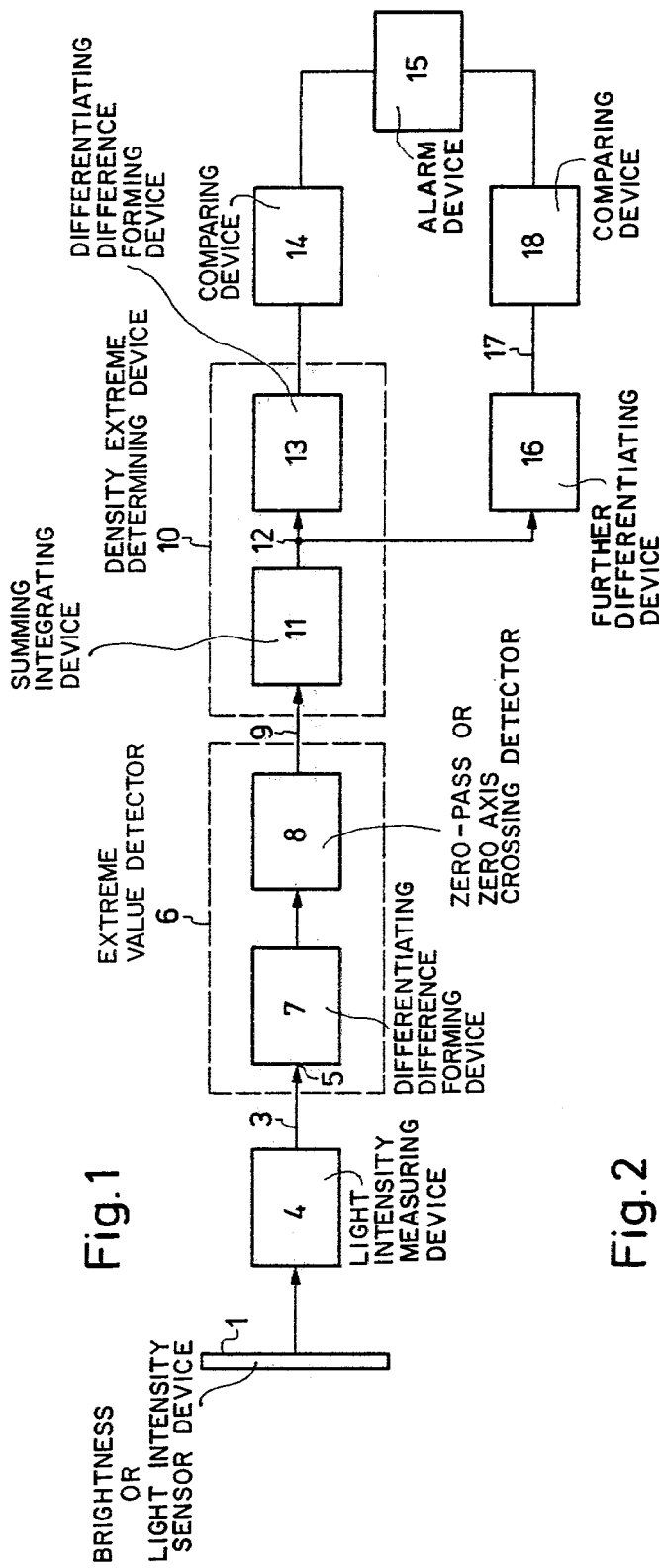
FIG. 1 shows a block diagram of an evaluating system with which unacceptable tire flaws can be automatically detected.

The apparatus according to the invention is characterized primarily by a brightness or light intensity measuring device which ascertains the brightness distribution of the interference pattern or figure along a "meridian" cutting line of the tire to be examined, which is succeeded by an extreme value detector which ascertains the position of the brightness extremes of the interference pattern which, in turn, is succeeded by a device for determining the density or distribution of extremes along the "meridian" line. The output of the device for determining the density of extremes is connected to a comparing device for comparing the extrema density values with predetermined extrema density limit values, which comparing device produces a signal corresponding to a transgression, or corresponding to an excess value, and which is passed to the output of the comparing device. The output of the comparing device is connected, in turn, to an alarm device for the provision of an alarm signal.

When operating with the foregoing apparatus, only occurrence of an alarm or call signal has to be observed, or order to remove a tire having flaws, or to direct this tire to a visual inspection. The aforementioned signal can also be used to control the apparatus so that when the call signal is given, the tire causing the signal is automatically sorted out or removed from the normal production sequence. By adjusting of the extreme limit density values it can be determined to what extent flaws are to be tolerated.

In accordance with a preferred embodiment, the tire checking apparatus can be provided in a manner that the brightness measuring device includes a light intensity sensor or brightness sensor which senses the interference figure along the "meridian" line. For this purpose, for example, the screen on which the interference figure is presented can be provided by the screen of a TV camera, in which case, preferably, the sensor is provided by an electron beam scanner or iconoscope device. It is, however, also possible to use as the sensor device, for example, a linear arrangement of photodiodes (photoelectric diodes) the pertaining measuring values (signals) of which are successively electronically interrogated.

The extreme value detector which follows the brightness measuring device comprises, preferably, a differentiating or difference forming device and a zero-axis crossing detector or zero pass detector. In this manner, it is determined at which locations along the "meridian" cutting line the extremes of the light intensity distribution are located.

The subsequent density extremes determining device, in particular, can include an integrating or summing device and, subsequent to this, a differentiating or difference forming device. At the output of the latter, there is obtained a value for each position along the "meridian" cutting line which represents or corresponds to the extreme density at this location. Since the density of extremes is a measure of the size or extent of a flaw in the tire, since the density of extremes will be that much greater or the distribution will be more dense or increased the greater the deformation at the inner surface of the tire, on the basis of this density value it can be seen whether the flaw or production error is still below an acceptable value or not.

For this purpose, the density values are fed to the comparator or comparing device, and are there compared with the maximally acceptable extreme density limit value for the pertaining location of the "meridian" section, i.e. with the points of a limit value curve stored in the comparing device. When the measured extreme density limit value is greater than the acceptable extreme density limit value for the pertaining location of the "meridian" cutting line, the comparing device provides the succeeding alarm device with a corresponding signal which signal causes a call or alarm signal.

In order to cover the entire inner surface of the tire, provisions are made so that either the tire or the representing device is continously rotatable in a manner that the representation of the interference lines moves vertically to the direction of the "meridian" cutting line at which the light intensity distribution is respectively determined. In order to evaluate the measured values also in this direction, a further differentiating device for forming a lateral or sidewise differential can be provided which is connected to a succeeding further comparing device which, in turn, is followed by a further call or alarm device.

For a better understanding of the invention as concerns the means for providing the interference pattern, reference may be had to the German published patent application No. 2,641,516 and also to U.S. Pat No. 3,976,380 of Hans Rottenkolber et al, issued Aug. 24, 1976,, the contents of which are hereby incorporated by reference.

Figure 2:
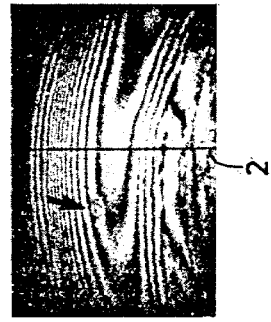
FIG. 2 shows a representation of a typical interference figure or pattern as it is presented by the representing or imaging device on a screen with the "meridian" cutting line being indicated at the center thereof along which the density or distribution of extrema is determined.
Figure 3:
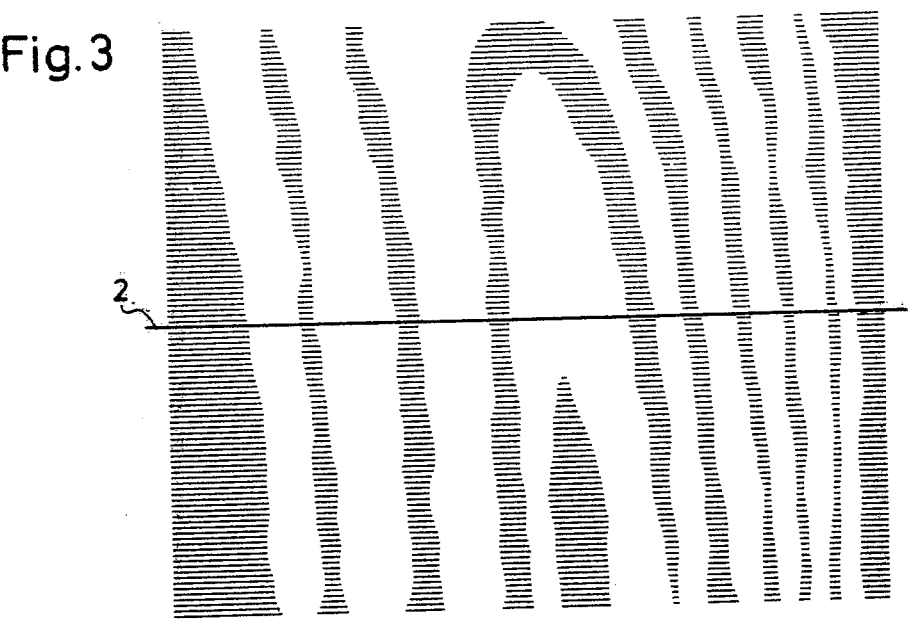
FIG. 3 is a simplified representation of the interference pattern or figure according to FIG. 2, in which only a few interference lines are indicated and the evaluation of which is shown in FIGS. 4 to 6.

Referring now particularly to the drawings, in FIG. 1 there is shown a preferred embodiment of an evaluating arrangement, in the form of a block circuit diagram for the tire checking apparatus according to the published German Patent Application No. 2,641,516. This evaluating arrangement comprises initially a brightness or light intensity sensor device 1, which can be in the form of an electron beam sensor device or a linear arrangement of photodiodes, which senses the light intensity values along the "meridian" cutting line 2 (FIG. 2). This sensor produces signals which are indicated at the output 3 of the actual light intensity measuring device 4.

Figure 4:
FIG. 4 shows the course or curve of the interference line over the "meridian" cutting line, densitometrically determined, in a manner so that the local position of the interference extremes can be determined.

The output 3 of the light intensity measuring device 4 is connected to an input 5 of an extreme value detector 6, which also serves as the input of a differentiating device 7 in which, by differentiating, the positions are established at which the brightness change is equal to zero, which, thus correspond to the brightness extremes. The locations of the brightness extrems are represented in the curve according to FIG. 4 in the form of peaks and valleys of the pertaining curve. In order to obtain these locations of the brighness extremes as positive measuring values, following the differentiating device 7, there is provided a zero-axis crossing or zero pass detector 8.

Figure 5:
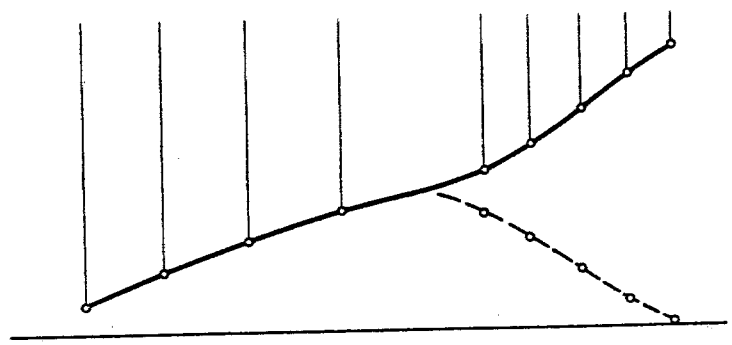
FIG. 5 shows a curve which results on integrating of the position values of the interference extremes.

The signal obtained at the output 9 of the extreme value detector 6 is passed to an extrema density determining device 10 in which initially the signal is integrated by means of an integrating device 11, so that a curve is obtained with the inclination thereof being, respectively, a measure of the extrema density or density of extremes of the particular locations of the "meridian" cutting line. The curve obtained by such an integration is indicated in FIG. 5. This curve has in its left part, which corresponds to left part of a tire, not shown, a steeper slope than in the right part, this being caused by the greater density of interference lines on the right tire half. The steeper slope of the curve is, accordingly, an indication of the deformation of the inner tire surface in this region which is indicative of a fatigue phenomenon in this zone. The individual points on the curve result due to the distance on the "meridian" cutting line 2 and respective equally large steps in the perpendicular to this cutting line. From the center of the picture these steps can be negative to obtain for the further signal processing, usefully, a somewhat bell-shaped curve (as is the case in the dash-line drawn extent of the curve which is the mirror image of the solid portion of the curve).

Figure 6:
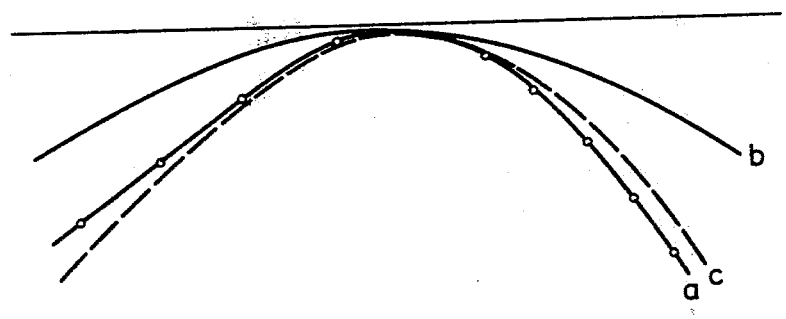
FIG. 6 shows a first curve which is obtained by a differentiating of the curve of FIG. 5, and two comparison curves of which one represents the maximally acceptable values of the deformation.

In order to obtain a curve which represents the extent of the extrema density along the "meridian" cutting line, the signal which is provided at the output 12 of the integrating device 11 is fed into a differentiating device 13 at the output of which signals are obtained which are represented in a curve as indicated in FIG. 6. The next following comparing device 14 compares these values with the values of the curve "c" according to FIG. 6, which curve "c" represents the maximally allowable extrema density values and, correspondingly, the permissible deformations and/or tire flaws. The curve "b" in FIG. 6 corresponds to the minimal deformation of the tire which occurs when the tire is free of flaws or defects.

When the comparing device 14 determines that a respectively measured extrema density value is above the maximally acceptable extrema density value, a corresponding signal is then fed to the alarm or call device 15 which triggers an alarm or call signal. With respect to the representation in FIG. 6, this means that an alarm signal is triggered when the curve "a" exceeds the lower side of curve "c".

In FIG. 6, the curve "a", which represents the actual values at the current position of the "meridian" cutting line, extends on the left side of the representation to the right of the curve "c" which indicates the tolerance limit (dash lines). On the right side this line is transgressed towards the left which indicates the unacceptable deformation on the tire surface and triggers the alarm or call signal.

So that the alarm device 15 will not provide a call signal at each transgression of the maximally acceptable extrema density value, the alarm device 15 can include an integrating member with appropriate time-constant which delays triggering of an alarm signal until the maximally acceptable extrema density is not only punctually or pointwise transgressed but also transgressed in a predetermined minimal interval. A timewise release or trigger action of the other coordinate, i.e. the coordinate which extend vertical to the "meridian" cutting line which is a coordinate, is attained by a further differentiating device 16 which is also connected to the output 12 of the integrating device 11 and which has an output 17 which is connected to a second comparing device 18 which can be identical, of course, in construction to comparing device 14 and in which is carried out a corresponding comparison as has been described earlier. The comparing device or comparator 18 is also connected to the alarm device 15 and, respectively, in the same sense the foregoing description describing the cooperation of the comparing device 14 with the alarm device 15 is applicable.

Figure 7:
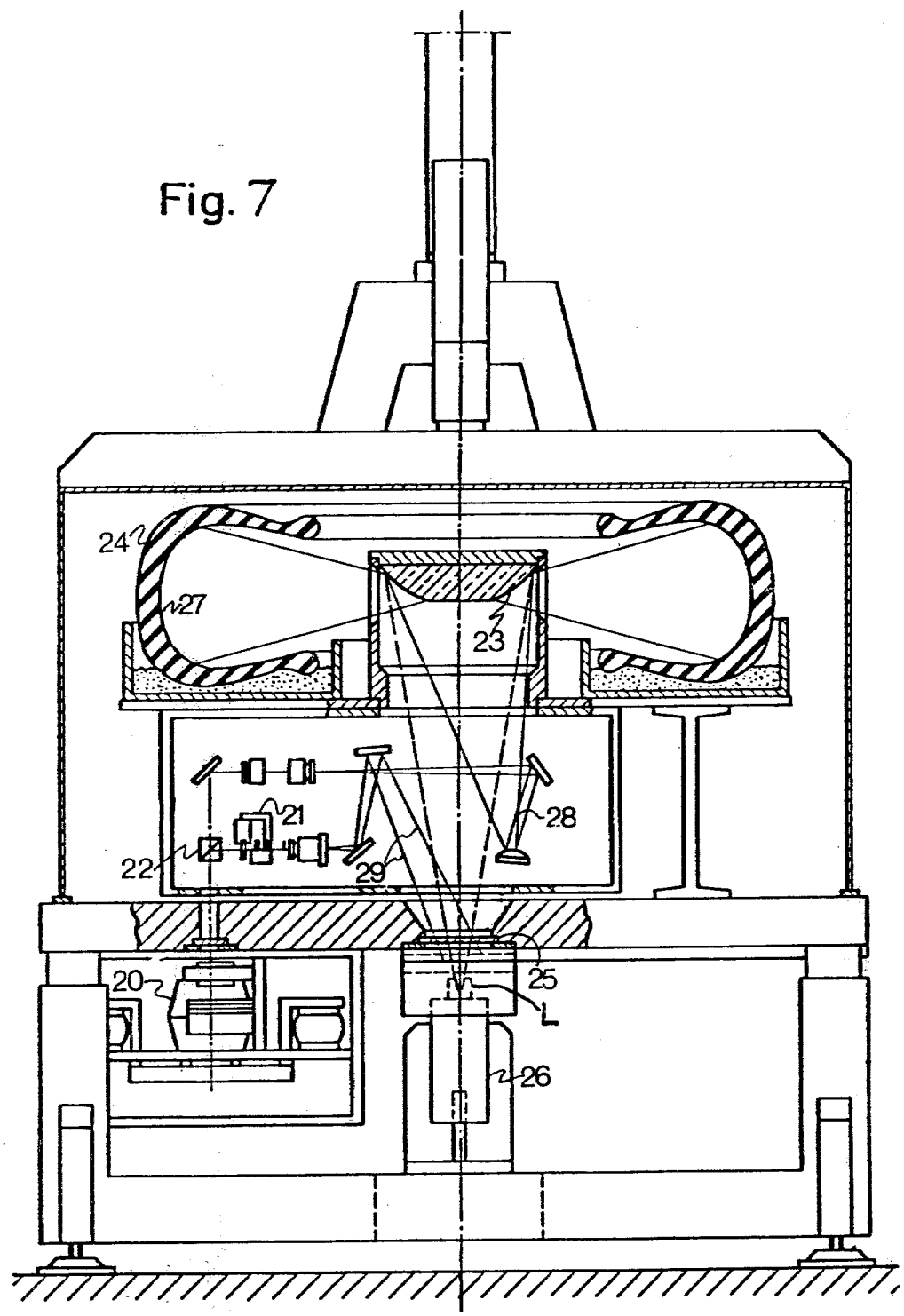
FIG. 7 shows a partially sectioned elevational view of apparatus having features in accordance with the present invention.

FIG. 7 illustrates an arrangement for non-destructive testing for material imperfection of vehicle tires, aircraft tires and the like. The arrangement includes means for producing on a screen an interference pattern of at least one "meridian" portion of an inner surface 27 of a tire 24 to be examined. Lens means L are suitably positioned at an observation point. A laser beam emitting source 20 along with a photo shutter 21 and an optical element 22 for dividing a beam emitted by the laser beam emitting source 20 into a object beam 28 and a reference beam 29 and for redirecting these beams can be provided with the arrangement. A conical mirror 23 is arranged in the path of the object beam so that a tire 24 to be examined can be positioned to be in concentric relation with respect to the concial mirror 23. A registering layer 25 and an observation system 26 are provided whereby the reflection points of the object beam emanate from a virtual light source, are reflected by the upper surface 27 of the tire which is being beamed and are located on ellipsoids of which the focal points are the virtual light source and observation point.

Reference can be made to FIG. 1 for brightness measuring means 1 as well as extreme value detector means 6 and indicator means or alarm devie 15 used with the arrangement of FIG. 7. The alarm signal 15 indicates a defective tire. The ellipsoids are not shown in FIG. 7 and for this purpose reference can be made to the German disclosure No. 2,641,516 and U.S. Pat. No. 3,976,380 mentioned previously in the present specification for the optical effect which is the state of the art not requiring any further detailed description at this time.

The present invention is, of course, in no way restricted to the specific disclosure of the specification and drawings, but also encompasses any modifications within the scope of the appended claims.

What I claim is:

1. A tire checking apparatus for nondestructive testing for imperfection of materials of vehicle tires, aircraft tires, and the like, including laser beam emitting means and means for producing an interference pattern of at least one "meridian" section of the inner surface of the tire which is to be examined, said apparatus comprising;
   brightness measuring means for ascertaining the brightness distribution of the pertaining interference pattern and for providing a corresponding output signal;
   extreme value detector means operatively connectible to said extreme value detector means for receiving and processing the pertaining processed signal of said extreme value detector means and for providing a signal corresponding to the density extremes along said at least on "meridian" section;
   means, operatively connectible to said density extremes determining means, for comparing said last recited signal with predetermined maximum acceptable threshold values for providing a trigger signal when said last recited signal exceeds the pertaining predetermined threshold value; and
   indicator means operatively connectible to said comparing means for receiving trigger signals for thereupon providing an alarm signal indicating an unallowable imperfection in a tire.

2. Apparatus according to claim 1, wherein said brightness measuring means includes a brightness sensor means for sensing the pertaining interference pattern along the "meridian" section line of the tire which is being examined.

3. Apparatus according to claim 2, wherein said interference pattern is presented on the screen of a television screen and wherein said brightness sensor means includes an electron beam sensor device.

4. Apparatus according to claim 2, wherein said brightness sensor means includes a linear arrangement of photo diodes.

5. Apparatus according to claim 1, wherein said extreme value detector is a differentiating, device and a zero-pass detector.

6. Apparatus according to claim 1, wherein said alarm signal indicates a defective tire.

7. Apparatus according to claim 1, wherein said extreme value detector is a difference-forming device and a zero-pass detector.

8. Apparatus according to claim 1, wherein said density extremes determining means are an integration device and wherin this integration device is operatively connectible to a differentiating device.

9. Apparatus according to claim 1, wherein said density extremes determining means are an integration device and wherein this integration device is operatively connectible to a difference forming device.

10. Apparatus according to claim 1, wherein said density extremes determining means are a summing device and wherein this summing device is operatively connectible to a differentiation device.

11. Apparatus according to claim 1, wherein said density extremes determining means are a summing device and wherein this summing device is operatively connectible to a difference forming device.

12. An arrangement for nondestructive testing for material imperfection of vehicle tires, aircraft tires, and the like, said arrangement including:
   means for producing on a screen an interference pattern of at least one "meridian" portion of the inner surface of a tire to be examined, said means comprising:
      lens means positioned at an observation point;
      a laser beam emitting source; a photo shutter; an optical element for dividing a beam emitted by said laser beam emitting source into an object beam and a reference beam and for redirecting said beams; a conical mirror arranged in the path of said object beam so that a tire to be examined can be positioned to be in concentric relation with respect to said conical mirror; a registering layer; an observation system; whereby the reflection points of the object beam emanate from a virtual light source, are reflected by the upper surface of the tire which is being beamed, and are located on ellipsoids the focal points of which are said virtual light source and said observation point;
   brightness measuring means for ascertaining the brightness distribution of the pertaining interference pattern and for providing a corresponding output signal;
   extreme value detector means operatively connectible for receiving and processing the pertaining processed signal and for providing a signal corresponding to the density extremes along said at least one "meridian" section;
   means, operatively connectible to said density extremes determining detector means, for comparing said last recited signal with predetermined maximum acceptable threshold values for providing a trigger signal when said last recited signal exceeds the pertaining predetermined threshold value; and
   indicator means operatively connectible to said comparing means for receiving trigger signals for thereupon providing an alarm signal indicating an unallowable imperfection in a tire.

* * * * *